United States Patent
Wajs

(10) Patent No.: US 9,733,717 B2
(45) Date of Patent: Aug. 15, 2017

(54) GESTURE-BASED USER INTERFACE

(75) Inventor: Andrew Augustine Wajs, Haarlem (NL)

(73) Assignee: DUAL APERTURE INTERNATIONAL CO. LTD., Daejeon (KR)

( * ) Notice: Subject to any disclaimer, the term of this patent is extended or adjusted under 35 U.S.C. 154(b) by 374 days.

(21) Appl. No.: 14/413,915

(22) PCT Filed: Jul. 12, 2012

(86) PCT No.: PCT/EP2012/063703
§ 371 (c)(1),
(2), (4) Date: May 26, 2015

(87) PCT Pub. No.: WO2014/008939
PCT Pub. Date: Jan. 16, 2014

(65) Prior Publication Data
US 2015/0261299 A1    Sep. 17, 2015

(51) Int. Cl.
*G06F 3/01*   (2006.01)
*G06K 9/00*   (2006.01)
(Continued)

(52) U.S. Cl.
CPC .............. *G06F 3/017* (2013.01); *G06F 3/011* (2013.01); *G06F 3/0304* (2013.01); *G06F 21/32* (2013.01);
(Continued)

(58) Field of Classification Search
CPC ........ G06F 3/017; G06F 21/32; G06F 3/0304; G06F 3/011; G06T 7/571;
(Continued)

(56) References Cited

U.S. PATENT DOCUMENTS 7,308,112 B2   12/2007  Fujimura et al.
7,380,112 B2 *  5/2008  Okabayashi ............ G06F 8/447
                                                          712/241
(Continued)

FOREIGN PATENT DOCUMENTS

EP          2474950 A1      7/2012
JP       2003-346162 A    12/2003
(Continued)

OTHER PUBLICATIONS

Japanese Office Action for corresponding Japanese patent application No. 2015-520827, dated Feb. 29, 2016.
(Continued)

*Primary Examiner* — Sath V Perungavoor
*Assistant Examiner* — Howard D Brown, Jr.
(74) *Attorney, Agent, or Firm* — Steven M. Koehler; Westman, Champlin & Koehler, P.A.

(57) ABSTRACT

A computer-implemented method for a gesture-based user interface and a gesture-based user interface system are described. The method comprises receiving image data from a multi-aperture image sensor in said electronic device, said image sensor being configured to simultaneously expose an image sensor to at least a first part of the electromagnetic (EM) spectrum using a first aperture and at least a second part of the EM spectrum using one or more second apertures; determining sharpness information in at least one area of said image data associated with at least part of an object imaged by said first aperture and said one or more second apertures onto the image plane of said image sensor; generating depth information on the basis of at least part of said sharpness information; and, recognizing on the basis of said depth information, at least part of a gesture associated with a movement of said object.

21 Claims, 11 Drawing Sheets

(51) Int. Cl.
*G06F 3/03* (2006.01)
*G06K 9/20* (2006.01)
*G06F 21/32* (2013.01)
*G06T 7/571* (2017.01)

(52) U.S. Cl.
CPC ..... *G06K 9/00073* (2013.01); *G06K 9/00355* (2013.01); *G06K 9/2018* (2013.01); *G06T 7/571* (2017.01); *G06T 2207/10016* (2013.01); *G06T 2207/10024* (2013.01); *G06T 2207/10048* (2013.01); *G06T 2207/10148* (2013.01); *G06T 2207/20056* (2013.01)

(58) Field of Classification Search
CPC . G06T 2207/20056; G06T 2207/10048; G06T 2207/10024; G06T 2207/10016; G06T 2207/10148; G06K 9/00073; G06K 9/2018; G06K 9/00355
See application file for complete search history.

(56) References Cited

U.S. PATENT DOCUMENTS

| | | | | |
|---|---|---|---|---|
| 8,866,912 | B2* | 10/2014 | Mullis | H04N 17/002 348/187 |
| 8,879,813 | B1* | 11/2014 | Solanki | G06T 7/0014 382/128 |
| 2008/0158377 | A1* | 7/2008 | Chanas | H04N 5/232 348/222.1 |
| 2011/0064282 | A1* | 3/2011 | Abramovich | G06K 9/00033 382/124 |
| 2011/0267485 | A1* | 11/2011 | Kane | G01S 11/12 348/222.1 |
| 2012/0249741 | A1* | 10/2012 | Maciocci | G06F 3/011 348/46 |
| 2012/0265479 | A1* | 10/2012 | Bridges | G01C 15/002 702/135 |
| 2013/0033578 | A1* | 2/2013 | Wajs | G06T 7/0065 348/46 |
| 2013/0033579 | A1 | 2/2013 | Wajs | |
| 2014/0138542 | A1* | 5/2014 | Inada | H01J 37/153 250/310 |
| 2014/0172363 | A1* | 6/2014 | Deichmann | G01B 11/2518 702/166 |
| 2014/0327755 | A1* | 11/2014 | Prabhakar | G06K 9/00604 348/78 |

FOREIGN PATENT DOCUMENTS

| | | |
|---|---|---|
| JP | 2007-538318 A | 12/2007 |
| WO | 2011101035 A1 | 8/2011 |
| WO | 2011101036 A1 | 8/2011 |

OTHER PUBLICATIONS

International Search Report and Written Opinion mailed May 10, 2013 for corresponding International Application No. PCT/EP2012/063703 filed Jul. 12, 2012.

Yuan et al., "Image Deblurring with Blurred/Noisy Image Pairs", ACM Transactions on Graphics (TOG)—Proceedings of ACM SIGGRAPH 2007 vol. 26, Issue 3, Jul. 2007, NY USA.

Zhou Ren et al., "Depth Camera Based Hand Gesture Recognition and its Applications in Human-Computer Interaction", IEEE International Conference on Information, Communication, and Signal Processing (ICICS), Singapore, Dec. 2011.

Al-Hamadi et al., "Hand Gesture Recognition Based on Combined Feature Extraction" International Journal of Information and Mathematical Sciences 6:1 2010.

Suryanarayan et al., "Dynamic Hand Pose Recognition Using Depth Data", Pattern Recognition (ICPR), 2010 20th International Conference Istanbul Aug. 23-26, 2010.

* cited by examiner

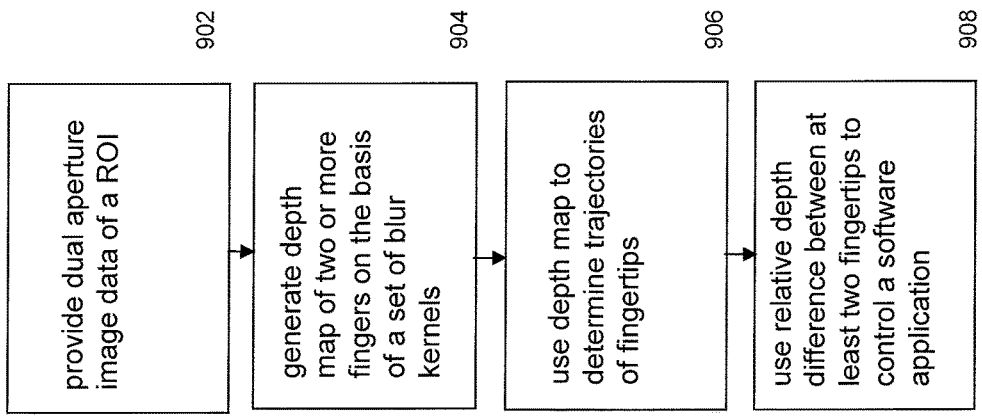
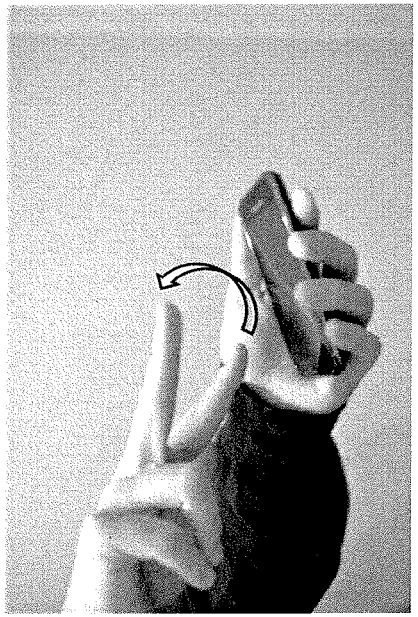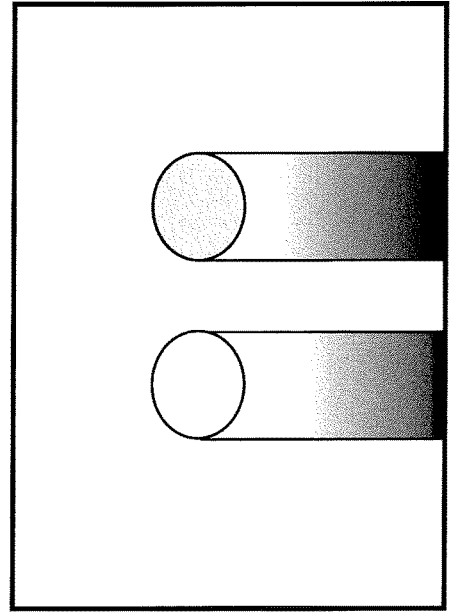
Figure 9A
Figure 9B

GESTURE-BASED USER INTERFACE

CROSS-REFERENCE TO RELATED APPLICATION

This application is a Section 371 national stage filing of International patent application Serial No. PCT/EP2012/063703, filed Jul. 12, 2012, and published as WO 2014/008939 A1 in English.

BACKGROUND

The discussion below is merely provided for general background information and is not intended to be used as an aid in determining the scope of the claimed subject matter. Aspects of the invention relate to a gesture-based user interface, and, in particular, though not exclusively, to a computer-implemented method for a gesture-based user interface, a gesture-based user-interface system and a computer program product using such method.

BACKGROUND OF THE INVENTION

Multimedia processing devices used in various fields of technology such as mobile telecommunications, automotive, gaming and biometrics commonly use touch-screen technology in order for a user to interact with the device via a graphical user interface. Although a touch-screen based user interface may provide a simple and intuitive way to interact with an electronic device, it still has limitations.

A touch-screen only provides a two-dimensional interface thereby limiting the way a user may interact with the electronic device to a limited set of touch-screen gestures so that more complex or fin action control. For example, a touch-screen is not suitable for emulating a user interface allowing e.g. graphical program for drawing graphics onto a screen wherein depending on the pressure extended onto the pen different line thickness can be achieved. In order to achieve such results using a touch screen typically a series of menu-driven input actions by the user (e.g. selecting a different pen thickness) is required.

Further, the way a user may interact with a touch screen is strongly determined by the size of the screen. Especially in case of small-screen electronic devices, interaction with multiple items displayed on the screen is difficult. Moreover, it requires close proximity of the user to the electronic device. In certain circumstances however, e.g. when operating an electronic device in a car, it may be desired that the driver is able to interact with an electronic device remotely, without actually touching it.

In order alleviate some of the above-mentioned problems, currently gesture-based user interfaces are developed which allow control of an electronic device using three-dimensional gestures so that the number of gestures, which may be used by a user to control the electronic device is extended considerably. For example, gaming game console interfaces such as Microsoft's Kinect have been developed allowing detection of motion such that gestures of a player may be used to control the game. Typically these systems rely on a depth-map generating optical processing system.

Further, the above-mentioned systems are not or at least less suitable for mobile applications. The Kinect sensor uses an infra-red laser diode is configured to project a predetermined pattern of infra-red speckles on objects in a scene and shifts in the projected pattern are captured by an infra-red image sensor and used to reconstruct a depth map of a scene of interest. In the design of mobile electronic devices however power consuming elements such as an infrared radiation source as not desired. Moreover, mobile design not only puts serious constrains on the power consumption, but also the design space allowing only a limited space for housing the optical system which thus should comprise as few components as possible. An additional limitation on TOF cameras is the short time of flight when using extremely short distances. For a few cm, the time resolution requirements become extreme.

Hence, there is need in the art for methods and systems for providing a gesture based user interface system for mobile devices, which allow accurate and fine-grained control using hand and/or finger gestures.

SUMMARY OF THE INVENTION

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background. In a first aspect the invention may relate to a computer-implemented method for a gesture-based user interface for controlling a software program on an electronic device, wherein said method may comprise: receiving image data from a multi-aperture image sensor in said electronic device, said image sensor being adapted to simultaneously expose an image sensor to at least a first part of the electromagnetic (EM) spectrum using a first aperture and at least a second part of the EM spectrum using one or more second apertures; determining sharpness information in at least one area of said image data associated with at least part of an object, preferably at least part a human body part, imaged by said first aperture and said one or more second apertures onto the image plane of said image sensor; generating depth information, preferably one or more depth maps, on the basis of at least part of said sharpness information; and, recognizing on the basis of said depth information, at least part of a gesture associated with a movement of said object.

Hence, the method allows a simple way of providing a gesture-based user interface for an electronic device. As the multi-aperture image sensor allows efficient and accurate determination of a dept map using the sharpness information in the infrared image data, a user interface can rendered which can be easily integrated in a mobile device and does not cause a high energy consumption.

In an embodiment, said method may further comprise: determining first image data associated with said first part of the electromagnetic spectrum; determining second image data associated with said second part of the electromagnetic spectrum; generating depth information by relating first sharpness information associated with at least part of an image of said object in said first image data and second sharpness information associated with at least part of said image of said object in said second image data to a distance between said image sensor and said object.

In an embodiment said depth information may be generated on the basis a predetermined depth function stored in a memory of said electronic device. Said depth function may be configured for associating sharpness information in said image data to a distance between the image sensor and the object. The method allows the use of a predetermined depth function which can be implemented in the electronic device during its manufacture.

In an embodiment, said depth function may be configured for associating sharpness information in said image data to at least one blur kernel from a set of blur kernels stored in a memory of said electronic device, wherein each of said blur kernels is associated with a predetermined depth value.

In an embodiment, generating said depth information may comprise: selecting a window in said image data, preferably said window comprising one or more pixels; associating sharpness information in said window to a blur kernel in said set of blur kernels on the basis of a minimization algorithm; assigning a depth value associated with said blur kernel to one or more pixels in said window. Predefined blur kernels in a filter bank may be used for efficiently relating blur information measured in the image data to a distance.

In an embodiment said minimization algorithm may comprise: convoluting at least one of said blur kernels with said sharpness information in said window.

In an embodiment, said method may further comprise: determining second image data associated with said second part of the electromagnetic spectrum; determining in said second image data at least two laterally displaced images, wherein each of said images is associated with a second aperture and wherein said images are associated with an object positioned at a distance before the image sensor; generating depth information on the basis of a predetermined depth function stored in a memory of said electronic device, said depth function being configured for associating the distance between said laterally displaced images to a distance between said image sensor and said object.

When compared with a single infrared aperture, the use of multiple infrared apertures allows the use of smaller apertures thereby achieving further enhancement of the depth of field and an improved accuracy for determining depth information. Further, the depth map can be generated on the basis of the infrared image data only by simply transforming the lateral displacement between infrared images associated with one object (or the high-frequency image data thereof) into a distance between the camera and an object.

In an embodiment, said multi-aperture image sensor may comprise two or more second apertures configured with respect to each other such that each of said second apertures images an object onto the image plane of said image sensor, wherein the distance between said laterally displaced images is a function of the distance between said object and said image sensor.

In yet another embodiment, the method may comprise: determining second high-frequency image data; determining said distance by running said second high-frequency image data through an auto-correlation function. A fast and efficient auto-correlation function may be used to determine a depth map.

In an embodiment, generating depth information may further comprise: forming one or more depth maps by assigning depth values to at least part of said image data generated by said multi-aperture image sensor. In an embodiment said first part of the EM spectrum is associated with at least part of the visible part of the EM spectrum. In an other embodiment said second part of the EM spectrum is associated with at least part of the invisible part of the EM spectrum. In yet another embodiment, said second part of the EM spectrum is associated with the infrared spectrum.

In an embodiment the method may further comprise: determining at least part of a region of interest (ROI) in at least part of an image frame associated with said image data on the basis of said a depth map. In another embodiment, the method may comprise the step of determining said region of interest on the basis of pixels associated with foreground depth values, wherein said foreground depth values lie within a predetermined range of depth values relatively close to the image plane of the multi-aperture image sensor. In one embodiment range of foreground depth values may be 1 to 100 cm, preferably 2 to 60 cm, more preferably 5 to 50 cm.

In an embodiment, the method may comprises: determining at least part of a region of interest in at least part of an image frame associated with said image data on the basis of color information, preferably determining said region of interest on the basis of color information which substantially matches color information associated with part of a human body. Hence, in this embodiment, color information from the color image may be used to efficiently select an area in the image data for which a depth map should be generated.

In an embodiment, recognizing said gesture may comprise extracting one or more depth features from said depth map. In another embodiment, recognizing said gesture may comprise extracting depth features from said depth map in a region of interest. In yet another embodiment, recognizing said gesture may comprise extracting one or more 2D features from an enhanced image formed blending first low-frequency image data associated with said first part of the EM spectrum with said second high-frequency image data and matching said depth features and, optionally, said 2D features, with one or more reference features associated with said human body part wherein in one embodiment said human body part may be a hand or finger part. Hence, the method allows gesture recognition both on depth information and features extracted from a color image which is enhanced on the basis of sharpness information from the infrared image data.

In another embodiment, one or more 2D features may be extracted from the infrared image data.

In an embodiment recognizing said gesture may comprise: determining one or more trajectories, preferably one or more spatial trajectories, of at least part of said body part on the basis said depth maps; correlating said determined trajectory with a reference trajectory associated with a predetermined gesture; establishing the detection of a predetermined gesture if said determined one or more trajectories correlate with a one or more reference trajectories; controlling said software program on the basis of said predetermined gesture.

In various embodiment, said method may further comprise at least one of the following steps: controlling said software program on the basis of moving one or more finger tips over one or more predetermined trajectories in the field of view of said multi-aperture imaging system; controlling said software program by moving a fingertip in a plane at a predetermined distance from said electronic device; controlling an activation or a deactivation function in said software program one the basis of moving a fingertip from a first distance to a second distance in the field of view of said image sensor; controlling said software program by moving said first detected finger tip relative to said second detected finger tip, preferably moving said first finger tip relative to said second finger tip over one or more predetermined trajectories in the field of view of said imaging sensor.

In a further embodiment said body part may be a finger tip. In yet a further embodiment, said method may comprise: on the basis of said depth map determining in said image data a region of interest associated with a fingertip;

extracting one or more directional features from an enhanced image formed by blending first low-frequency image data associated with said first part of the EM spectrum with said second high-frequency image data; authenticating a user by matching said extracted directional features with directional reference features associated with a fingerprint of said user.

In a further aspect, the invention may be related to gesture-based user interface system for use in an electronic device, said user interface system being adapted to control a software program on said electronic device, wherein said system may comprise: a multi-aperture image sensor for generating image data, said multi-aperture image sensor being adapted to simultaneously expose an image sensor to at least a first part of the electromagnetic (EM) spectrum using a first aperture and at least a second part of the EM spectrum using one or more second apertures; one or more filters for generating sharpness information in at least one area of said image data associated with at least part of an object, preferably at least part a human body part, imaged by said first aperture and said one or more second apertures onto the image plane of said image sensor; a generator configured for generating depth information, preferably one or more depth maps, on the basis of at least part of said sharpness information; and, a gesture recognition module adapted to recognize on the basis of said depth information a gesture associated with a movement of said object.

In an embodiment said user interface system may comprise, wherein said depth function is configured for associating first sharpness information associated with said first aperture and second sharpness information associated with said one or more second apertures to a distance between the image sensor and the object; or, wherein said depth function is configured for associating a distance between at least two laterally displaced images associated with at least two of said second apertures to a distance between said object and said image sensor.

In an embodiment said depth function in said user interface system is configured for associating first sharpness information associated with said first aperture and second sharpness information associated with said one or more second apertures to at least one blur kernel from a set of blur kernels stored in a memory of said electronic device, wherein each of said blur kernels is associated with a predetermined distance a distance between the image sensor and an object.

In an embodiment said gesture recognition module may be configured for: determining one or more trajectories, preferably one or more spatial trajectories, of at least part of said body part on the basis said depth maps; correlate said determined trajectory with a reference trajectory associated with a predetermined gesture; establish the detection of a predetermined gesture if said determined one or more trajectories correlate with a one or more reference trajectories; controlling said software program on the basis of said predetermined gesture.

In a further embodiment said gesture recognition module may be configured for at least one of the following functions: controlling said software program on the basis of moving one or more finger tips over one or more predetermined trajectories in the field of view of said multi-aperture imaging system; controlling said software program by moving a fingertip in a plane at a predetermined distance from said electronic device; controlling an activation or a deactivation function in said software program one the basis of moving a fingertip from a first distance to a second distance in the field of view of said image sensor; and/or, controlling said software program by moving said first detected finger tip relative to said second detected finger tip, preferably moving said first finger tip relative to said second finger tip over one or more predetermined trajectories in the field of view of said imaging sensor.

Hence, from the above-described embodiments, it follows that the gesture-based user interface system, allows intuitive gesture-based control of a software program. The user interface allows accurate control of an electronic device or an application running thereon on the basis depth maps generated using image data of a multi-aperture image sensor. The user interface system is suitable for use in electronic equipment, such as mobile equipment, allowing control of an application running thereon without requiring the user to be in physical contact with the electronic device.

The invention may also relate to a computer program product for providing a gesture-based user interface wherein said computer program product comprises software code portions configured for, when run in the memory of a computer system, executing any of the method steps as described above.

The invention will be further illustrated with reference to the attached drawings, which schematically will show embodiments according to the invention. It will be understood that the invention is not in any way restricted to these specific embodiments.

BRIEF DESCRIPTION OF THE DRAWINGS

FIGS. 9A and 9B depict controlling an electronic device or an application running thereon on the basis of a gesture based user interface according to another embodiment of the invention.

DETAILED DESCRIPTION

Figure 1:
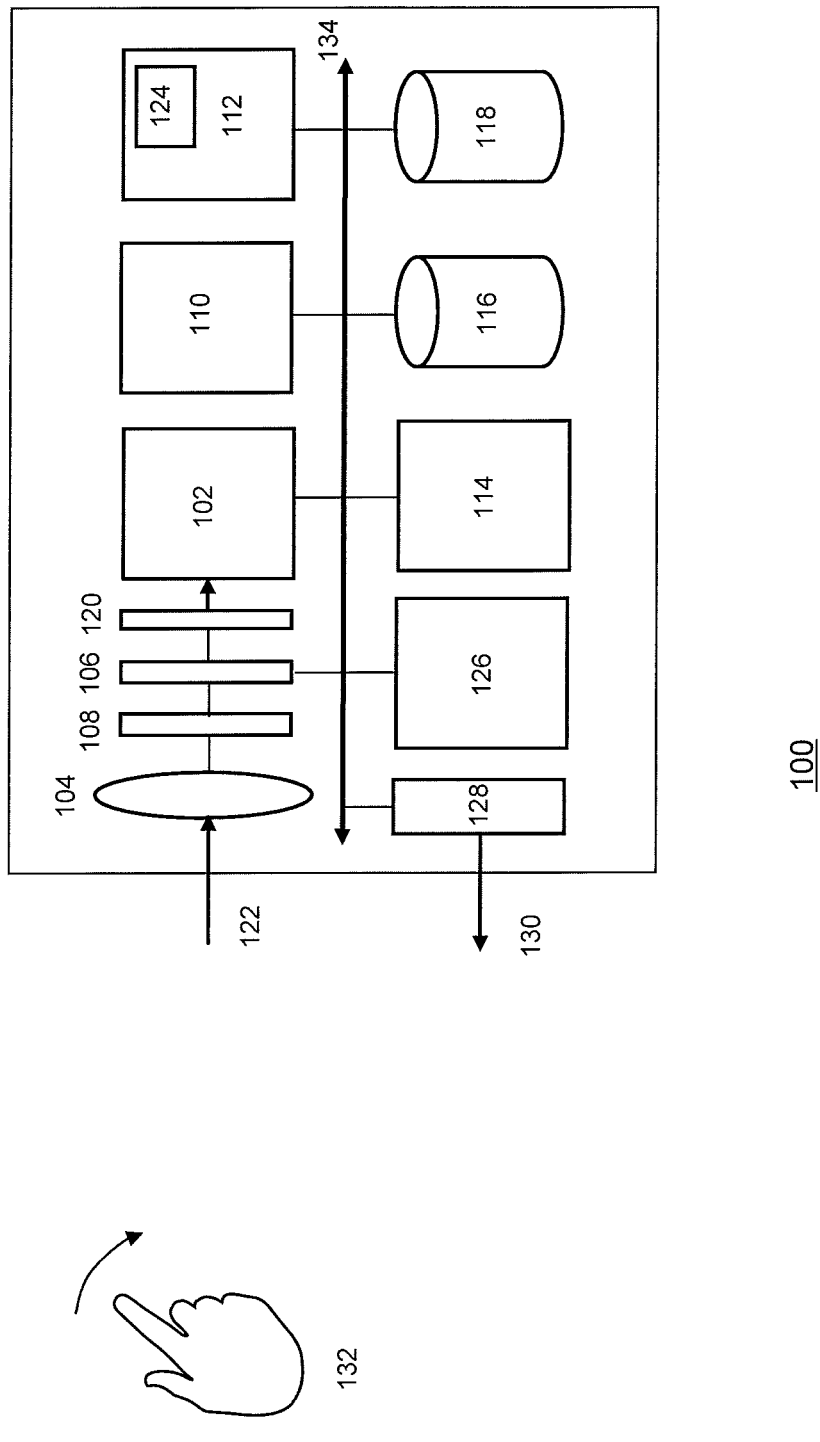
FIG. 1 depicts an electronic device comprising a gesture based user interface according to one embodiment of the invention.

FIG. 1 depicts an electronic device comprising a gesture-based user interface (UI) system according to one embodiment of the invention. In particular, FIG. 1 depicts an electronic device 100 comprising a gesture-based UI system comprising a multi-aperture image sensor 102, a data-processing module 103 configured to process data generated by the multi-aperture image sensor 102 and to enable user interaction, in particular gesture-based user interaction, with the electronic device 100 or a software application running thereon. An output module 128, e.g. a light-emitting display or a projection-based display may be configured to provide visual information to the user regarding the user interaction.

The electronic device 100 may be part of a digital camera or integrated in a mobile phone, an electronic tablet, a webcam, a biometric sensor, image scanner or any other multimedia device requiring image-capturing functionality. The multi-aperture image sensor may comprise an image sensor 102, comprising rows and columns of photosensitive sites (pixels) forming a two-dimensional pixel array. The image sensor 102 may be a CMOS (Complimentary Metal Oxide Semiconductor) active pixel sensor or a CCD (Charge Coupled Device) image sensor. Alternatively, the image sensor 102 may relate to other Si (e.g. a-Si), III-V (e.g. GaAs) or conductive polymer based image sensor structures.

The multi-aperture image sensor 102 may further comprise an optical lens system 104 for focusing and projecting objects associated with a scene of interest onto the imaging plane of the image sensor. The exposure of the image sensor 102 is controlled using a shutter 106 and a wavelength-selective, multi-aperture aperture system 108. The multi-aperture system 108 (in short a multi-aperture) relates to an optical assembly comprising a predetermined number of wavelength-selective apertures for exposing the image sensor with electromagnetic (EM) radiation of a first part, e.g. a visible part, and at least a second part of the EM spectrum, e.g. a non-visible part such as part of the infrared) of the EM spectrum.

Figure 2:
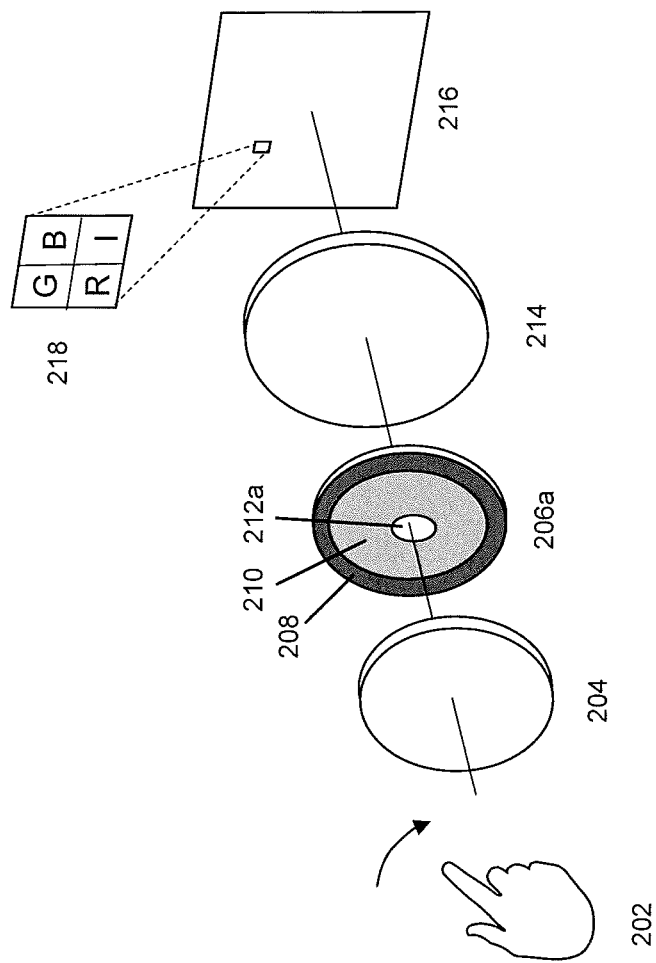
FIG. 2 depicts a multi-aperture imaging system enabling a gesture based user interface according to an embodiment of the invention.

A detailed description of the wavelength-selective multi-aperture image sensor 102 and its advantageous uses are described in more detail in international patent applications WO2011/101035 and WO2011/101036, which are hereby incorporated by reference into this application. One implementation of a multi-aperture sensor is schematically depicted in FIG. 2. The multi-aperture system 206 may comprise a stop 208, at least a first wavelength-selective aperture 210 of a first size for exposing the image sensor with a first part of the EM spectrum and at least a second wavelength-selective aperture 212 of a second size for exposing the image sensor with a second part of the EM spectrum.

In an embodiment, the multi-aperture system 206 may comprise a transparent substrate with two different thin-film optical filters: a first thin-film filter of a predetermined shape, e.g. circular shape, in the center of the substrate forming the first aperture 212, which is transparent for radiation in a first band of the EM spectrum; and, a second thin-film filter, which is transparent for radiation in a second band of the EM spectrum. The second thin-film filter defining the second aperture 210 may be formed around the first filter, e.g. in a concentric ring. The outer diameter of the second aperture 210 may be defined by an opening in an opaque aperture holder defining the stop 208. Alternatively, the stop 208 may be realized using opaque thin film layer deposited on the substrate.

In one embodiment, the first filter may be transparent for both visible and at least part of the infrared radiation. In another embodiment, the second filter may be configured to reflect all, or at least a substantial part of the infrared radiation, so that it is only transparent for visible radiation.

It is clear for a skilled person that a multi-aperture system comprising two apertures may be easily extended to a multi-aperture comprising three or more apertures, e.g. in the form of concentric rings, wherein each aperture transmits radiation associated with a particular band in the EM spectrum, e.g. a particular color band (red, green, blue or combinations thereof) or infrared band (e.g. near, mid or far infrared or combinations thereof).

In one embodiment, the second thin-film filter may comprise a dichroic filter, which reflects radiation in the infrared spectrum and transmits radiation in the visible spectrum. Dichroic filters (sometimes also referred to as interference filters) are well known in the art and typically comprise a number of thin-film dielectric layers of specific thicknesses, which are configured to reflect infrared radiation (e.g. radiation having a wavelength between approximately 750 to 1250 nanometers) or a part thereof and to transmit radiation in the visible part of the spectrum.

The exposure of the image sensor (e.g. 216 in FIG. 2) to EM radiation entering the lens system 204 may be controlled by a shutter and the multi-aperture system 206. When the shutter is opened, the apertures control collimation and the amount of radiation associated with different parts of the EM spectrum exposing the image sensor 216. The shutter may be a mechanical shutter or, alternatively, the shutter may be an electronic shutter integrated in the image sensor. When the light is projected by the lens system 204 onto the image sensor 216, each pixel produces an electrical signal, which is proportional to the electromagnetic radiation (energy) incident on that pixel.

In order to obtain color information of an image, which is projected onto the imaging plane of the image sensor 216, typically a color filter array 214 (CFA) is interposed between the lens 204 and the image sensor 216. The color filter array 214 may be integrated with the image sensor 216 such that each pixel of the image sensor 216 has a corresponding pixel filter. Each color filter is adapted to pass light of a predetermined color band into the pixel. Usually a combination of red, green and blue (RGB) filters is used, however other filter schemes are also possible, e.g. CYGM (cyan, yellow, green, magenta), RGBE (red, green, blue, emerald), etc. Preferably, the image sensor 216 may also comprise infrared (IR) pixels, i.e. pixels that are configured to capture at least part of the IR EM radiation that passes the small IR transparent aperture of the multi-aperture system.

A combined color and infrared image sensor may be realized by combining a CFA with pixel filters, which block the visible light and which is transparent for IR radiation, into an infrared/color filter array (ICFA) 218. Alternatively, the image sensor 216 may be implemented as an array of stacked photodiodes. Part of these photo-diodes may be buried within the Silicon substrate wherein photo-diodes, which close to the surface substrate are more sensitive to radiation of short wavelength, e.g. blue light, and photo-diodes which are buried deeper in the substrate are more sensitive to radiation of longer wavelengths, e.g. red or infrared radiation.

Each pixel of the exposed image sensor 216 produces an electrical signal proportional to the electromagnetic radiation. The array of pixels thus generates image data, representing the spatial distribution of the electromagnetic energy (radiation) passed through the color filter array or absorbed by the array of stacked photo-diodes. The signals received from the pixels may be amplified using one or more on-chip amplifiers. Here, the signals associated with color or infrared pixels may be referred to as a color or infrared channel respectively. Each channel may be amplified using a separate amplifier, thereby allowing to separately control the ISO speed for different colors.

Hence, the output of the image sensor 216 is adapted to produce image data associated with multiple color channels (e.g. R, G, B channels or C, Y, G, M channels, etc.) and one or more infrared channels. Image data associated with these visible and infrared channels hereafter are hereafter referred to in short as color image data and infrared image data respectively. Image data generated on the basis of one exposure of the image sensor 216 define an image frame which can be decomposed into image frames associated with the color channels (color image frames) and infrared channels (infrared image frames). These image frames may be processed using known demosaicing algorithms in order to render these them into a viewable image format.

As depicted in FIG. 1, pixel signals generated by the image sensors may be processed by the data-processing module, e.g. sampled, quantized and transformed into image frames of a predetermined data format. To that end, the data-processing module may comprise one or more Analog to Digital (A/D) converters 110. In one embodiment, the A/D converters may be integrated on the chip of the image sensor 102. This way the multi-aperture image sensor may continuously produce a stream of image frames or parts thereof, which are processed by a digital signal processor 112 (DSP), which is configured to perform well known signal processing functions such as interpolation, filtering, white balance, brightness correction, data compression techniques (e.g. MPEG or JPEG type techniques).

The DSP 112 may comprise a signal processing function 124 configured to process the color and infrared image data and to determine the sharpness information associated with an image frame. Sharpness information may e.g. be obtained by applying a high-pass digital filter to the image data. Sharpness information may be extracted from, e.g. the low-noise infrared channel, and used to enhance the sharpness in one or more color channels. For example, the image data associated with the relatively noisy color channels (e.g. the RGB color channels) may low-passed filtered, demosaiced in a color image and subsequently combined (blended) with the high-frequency image data of the low-noise infrared channel into an infrared enhanced color image, i.e. a color image with an enhanced depth of field (DOF).

More particular, pixels of the image sensor 102 may receive a first (relatively) wide-aperture image signal associated with visible spectral energy having a limited DOF overlaying a second small-aperture image signal associated with the infrared spectral energy having a large DOF. Therefore, objects close to the plane of focus of the lens 104 are projected onto the image plane of the image sensor 102 with relatively small defocus blur by the visible radiation, while objects further located from the plane of focus are projected onto the image plane with relatively small defocus blur by the infrared radiation.

The DSP 112 may extract sharpness information, i.e. high-frequency information, from the IR image data by filtering the IR image data using a high-frequency filter. The high-frequency IR image data may be blended with the RGB image (associated with the relatively large first aperture) thereby increasing the DOF of the image. This way, the multi-aperture system may allow extension of the depth of field (DOF) and increase of the ISO speed for digital cameras with a fixed focus lens in a simple and cost effective way.

For example, the DOF of a simple mobile phone camera with a typical f-number of 7 (focal length 7 mm and an aperture diameter of 1 mm) may be improved using at least a second aperture which may vary e.g. between 14 for a diameter of 0.5 mm up to 70 for diameters equal or less than 0.2 mm, wherein the f-number is defined by the ratio of the focal length f and the effective diameter of the aperture. Preferable implementations include an optical system including a multi-aperture comprising an f-number for visible light between 2 and 4 for obtaining sharpness of objects, which are relatively close to the camera, and an f-number for the infrared aperture between 16 and 22 for obtaining sharpness of more distant objects.

Implementation of a multi-aperture system into known digital imaging system only require minor adaptations and are thus suitable for mass-producing and mobile applications. Furthermore, as will be described hereunder in more detail, the multi-aperture system allows determination of distance information, e.g. a depth map, associated objects in a scene of interest on the basis of the image data captured by the multi-aperture sensor.

The data-processing module may further comprise one or more buffers 116 for temporarily storing captured image data (e.g. raw image data) and, possibly, data-processed image data and a memory 118, such as EEPROM or another type of nonvolatile memory, comprising one or more one or more applications, software programs, which may be controlled by a particular gesture detected by a gesture recognition module 126 in a sequence of image frames produced by the multi-aperture image sensor.

In order to determine whether a particular object in a sequence of image frames can be classified as a gesture, e.g. a hand or finger gesture 132, a depth-map generator 114 may continuously generate depth maps on the basis of image frames generated by the multi-aperture image sensor. The gesture recognition module 126 may use these depth maps and, optionally, the associated enhanced color image images in order to detect a hand (or parts thereof) in an image, to track predetermined parts of the head (e.g. one or more fingers and/or finger tips) and classify predetermined movements of these parts as a gesture. When a particular gesture is recognized, the gesture recognition module 126 may generate a control signal allowing control of an application. This way, the multi-aperture image sensor and the data-processing module thus form a gesture-based UI system for controlling the electronic device or a software application running thereon.

The electronically controlled elements in the multi-aperture system, in the data-processing module and in the display module are connected by a data bus 134 to a central processor (not shown) for managing the operation of the electronic device and the gesture-based user interface (UI) system. The functions and processes for enabling the gesture-based user interface (UI) system to efficiently and accurately determine hand gestures 132 and, in particular, hand gestures associated with one or more finger movements, are described hereunder in more detail with reference to FIG. 3-6.

In order to accurately recognize hand and/or finger gestures 132, the gesture-based user interface (UI) system continuously generates a depth map (or at least part of a depth map) for each or at least some image frames generated by the multi-aperture sensor. As will be described hereunder in more detail, the depth map is determined on the basis of image data captured by the multi-aperture image sensor and a depth function R(s) in the DPS, which is configured for assigning a part of an image to a particular depth values.

In one embodiment, a depth function R may be determined by analyzing sharpness information of the color image components and the infrared image components for objects at different distances away from the camera lens. Here, analysis of sharpness information may include analysis of the so-called circle of confusion, which corresponds to the blur spot diameter measured by the image sensor of an imaged point in object space. The blur disk diameter representing the defocus blur is very small (zero) for points in the focus plane and progressively grows when moving away to the foreground or background from this plane in object space. As long as the blur disk is smaller than the maximal acceptable circle of confusion c, it is considered sufficiently sharp and part of the DOF range. From the known DOF formulas, it follows that there is a direct relation between the depth of an object, i.e. its distance s from the camera, and the amount of defocus blur (i.e. the sharpness) of that object imaged onto image sensor. The blur further depends on the optical parameters, in particular the lens parameters, associated with the imaging system.

Hence, in a multi-aperture imaging system, the increase or decrease in sharpness of the RGB components of a color image relative to the sharpness of the IR components in the infrared image depends on the distance of the imaged object from the lens. For example, if the lens is focused at 3 meters, the sharpness of both the RGB components and the IR components may be the same. In contrast, due to the small aperture used for the infrared image for objects at a distance of 1 meter, the sharpness of the RGB components may be significantly less than those of the infrared components. This dependence may be used to estimate the distances of objects from the camera lens.

In particular, if the lens is set to a large ("infinite") focus point (this point may be referred to as the hyperfocal distance H of the multi-aperture system), the camera may determine the points in an image where the color and the infrared components are equally sharp. These points in the image correspond to objects, which are located at a relatively large distance (typically the background) from the camera. For objects located away from the hyperfocal distance H, the relative difference in sharpness between the infrared components and the color components will increase as a function of the distance s between the object and the lens. The ratio between the sharpness information in the color image and the sharpness information in the infrared information measured at one spot (e.g. one or a group of pixels) will hereafter be referred to as the depth function R(s).

The depth function R(s) may be obtained using a calibration method wherein the sharpness information of the color and infrared components in the multi-aperture image data associated with one or more imaged test objects located at different predetermined distances s from the camera lens is determined. The depth function may be determined in advance by the manufacturer and implemented as a function in the DPS 112.

Other ways of determining the distance on the basis of the sharpness information are also possible without departing from the invention. For example instead of analyzing sharpness information in the spatial domain using e.g. a high-pass filter, the sharpness information may also be analyzed in the frequency domain. For example in one embodiment, a running Discrete Fourier Transform (DFT) may be used in order obtain sharpness information. The DFT may be used to calculate the Fourier coefficients of both the colour image and the infrared image. Analysis of these coefficients, in particular the high-frequency coefficient, may provide an indication of distance.

For example, in one embodiment the absolute difference or the ratio between the high-frequency DFT coefficients associated with a particular area in the color image and the infrared image may be used as an indication for the distance. In a further embodiment, the Fourier components may be used for analyzing the cutoff frequency associated with infrared and the color signals. For example if in a particular area of the image the cutoff frequency of the infrared image signals is larger than the cutoff frequency of the color image signal, then this difference may provide an indication of the distance.

In one embodiment, the distance function may be based on a number of blur kernels associated with different depths. The defocus blur in a predetermined window of an image may be described as the local convolution of a sharp, non-blurred window and a predetermined filter $H_d$ (hereafter also referred to as a blur or defocus kernel associated with a distance or depth d). Hence, for each window in an image, the above-mentioned defocus blur can be associated with a predetermined blur kernel, which is specific for the multi-aperture image sensor configuration (defined by e.g. lens, image sensor and aperture parameters).

This relation may be used to efficiently render a depth map from the image data generated by the multi-aperture image sensor. To that end, during or after manufacturing of an electronic device comprising gesture-based user interface (UI) system, a calibration method is performed wherein at least one filter bank comprising blur kernels $H_{di}$ (i=1, ..., N) associated with a range of depths $d_1, d_2, ..., d_N$ is generated on the basis of the infrared and color image data and stored in a memory of the gesture-based user interface (UI) system.

Figure 3B:
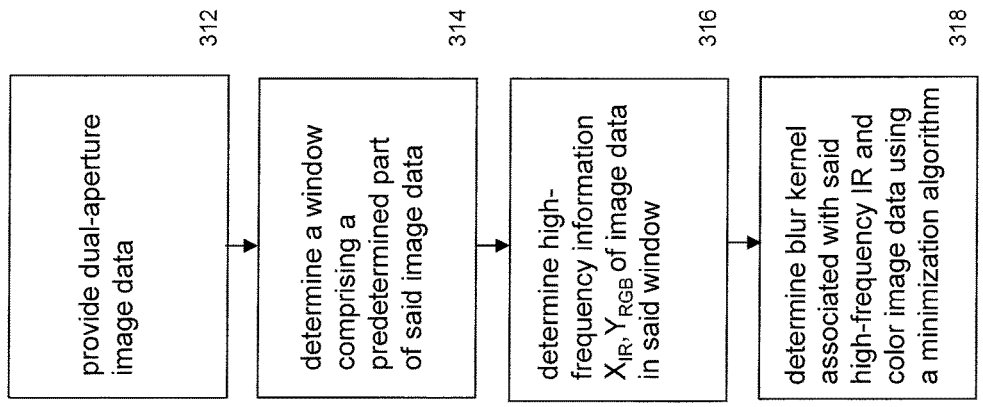
FIGS. 3A and 3B depict a system and method for calibrating the multi-aperture for enabling a gesture based user interface according to an embodiment of the invention.
Figure 3A:
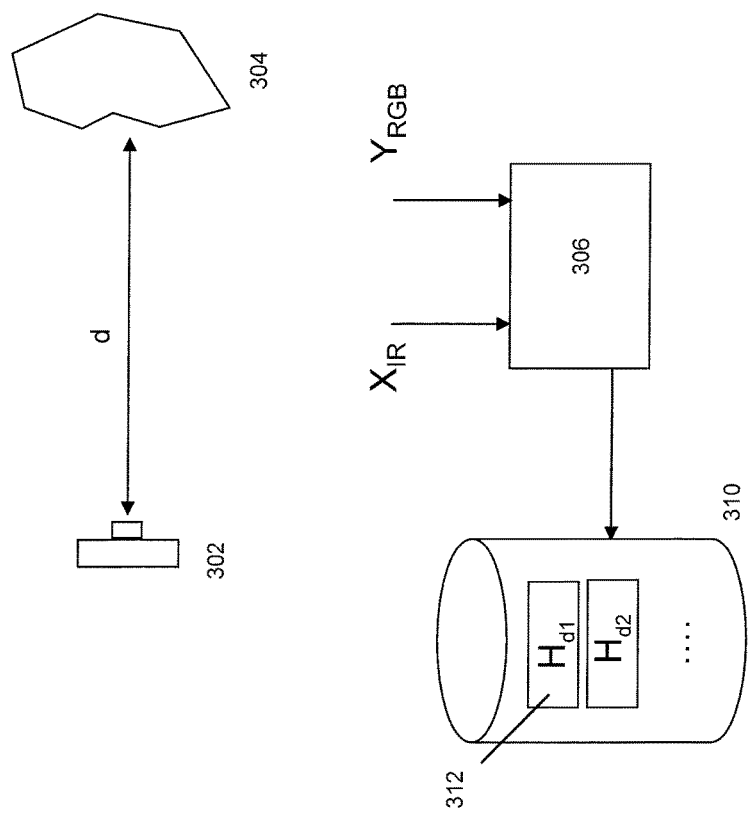

A process for generating such filter bank is illustrated in more detail in FIGS. 3A and 3B. This figure depicts a calibration set-up and a method for determining a filter bank of blur kernels $H_{di}$ (i=1, ..., N) wherein a test object 304 is positioned at a predetermined distance d away from an electronic device comprising the multi-aperture sensor 302. Then, multi-aperture image data associated with an object distance d of the test object 304 are generated (step 312). In one embodiment, an edge filter or another suitable filter may be used do to determine a predetermined window associated with the imaged test object comprising sufficient edge information (step 314) so that accurate depth estimation can be achieved.

In a further step 316, the color and infrared image data are high-pass filtered in order to obtain the sharpness information of the color channels and infrared channels in the window. In particular, the high-frequency filtered color image data comprise sharpness information $Y_{RGB}$ associated with the color channels obtained by exposing the image sensor with a first aperture and the high-frequency filtered infrared image data comprise sharpness information $X_{IR}$ in the same window by exposing the image sensor with a second (smaller) aperture. The relation between $Y_{RGB}$ and $X_{IR}$, i.e. $Y_{RGB}=H_d \otimes X_{IR}$ wherein $\otimes$ is the convolution operator, allows estimation of the blur kernel for that particular distance.

In one embodiment, a blur kernel $H_d$ associated with one or more pixels in a window of an image frame may be estimated on the basis of the high-frequency image data $Y_{RGB}$ and $X_{IR}$ in that window using a suitable optimization algorithm. For example, the blur kernel may be determined using an iterative kernel estimation using a constrained least-squares optimization method as e.g. described in the article by Lu Yuan et. Al. in "Image Deblurring with Blurred/Noisy image pairs" ACM Transactions on Graphics (TOG)—Proceedings of ACM SIGGRAPH 2007 Volume 26 Issue 3 Jul. 2007, NY, USA, wherein a Tikhonov regularization method is used to stabilize the solution.

FIG. 3A schematically depicts the blur kernel optimization process. In this scheme, the sharpness information $Y_{RGB}$ and $X_{IR}$ in particular window of an image frame, e.g. one pixel or a group of pixels, may be input to a linear least-squares optimization algorithm 306. In particular, $Y_{RGB}$ and $X_{IR}$ associated with a window may be input to optimization algorithm 306 wherein the output of the algorithm is an estimated blur kernel $H_d$ 312, which is stored in a memory 310 of the electronic device. This process may be repeated for different object distances (depths) $d_i$ (i=1, . . . , N) so that for each depth an associated blur kernel is generated.

Hence, from the above, it follows that a filter bank comprising a predetermined number of estimated blur kernels $H_{di}$ associated with a particular multi-aperture image sensor configuration may be generated by the steps of: generating color image data associated with a first aperture and infrared image data associated with a second aperture of (part of) a test object positioned at a predetermined object distance before the multi-aperture image sensor; determining sharpness information associated with said color and infrared image data; estimating a blur kernel associated with that object distance on the basis of at least part of said color and infrared image data using a minimization algorithm; storing the blur kernel and the associated object distance (depth) in a memory; and, repeating the above process for different object distances.

The process may be repeated by increasing the object distance over a desired value, e.g. a value selected between 0.1 and 100 cm, so that a memory bank is formed comprising a set of blur kernels $H_{di}$ (i=1, . . . , N), which may be pre-configured in the memory 118 of data-processing module as e.g. depicted in FIG. 1. These filters are used by the gesture-based user interface (UI) system in order to efficiently generate a distance map for each image frame generated by the multi-aperture image sensor.

In one embodiment, blur kernels may be formed on the basis of image data associated with one color channel, e.g. the green channel $Y_G$ or the blue channel $Y_B$. In another embodiment, blur kernels may be formed on the basis of image data associated with two or more color channels. Increasing the number of color channels may increase for accurately determining a depth map.

Figures 4A, 4B:
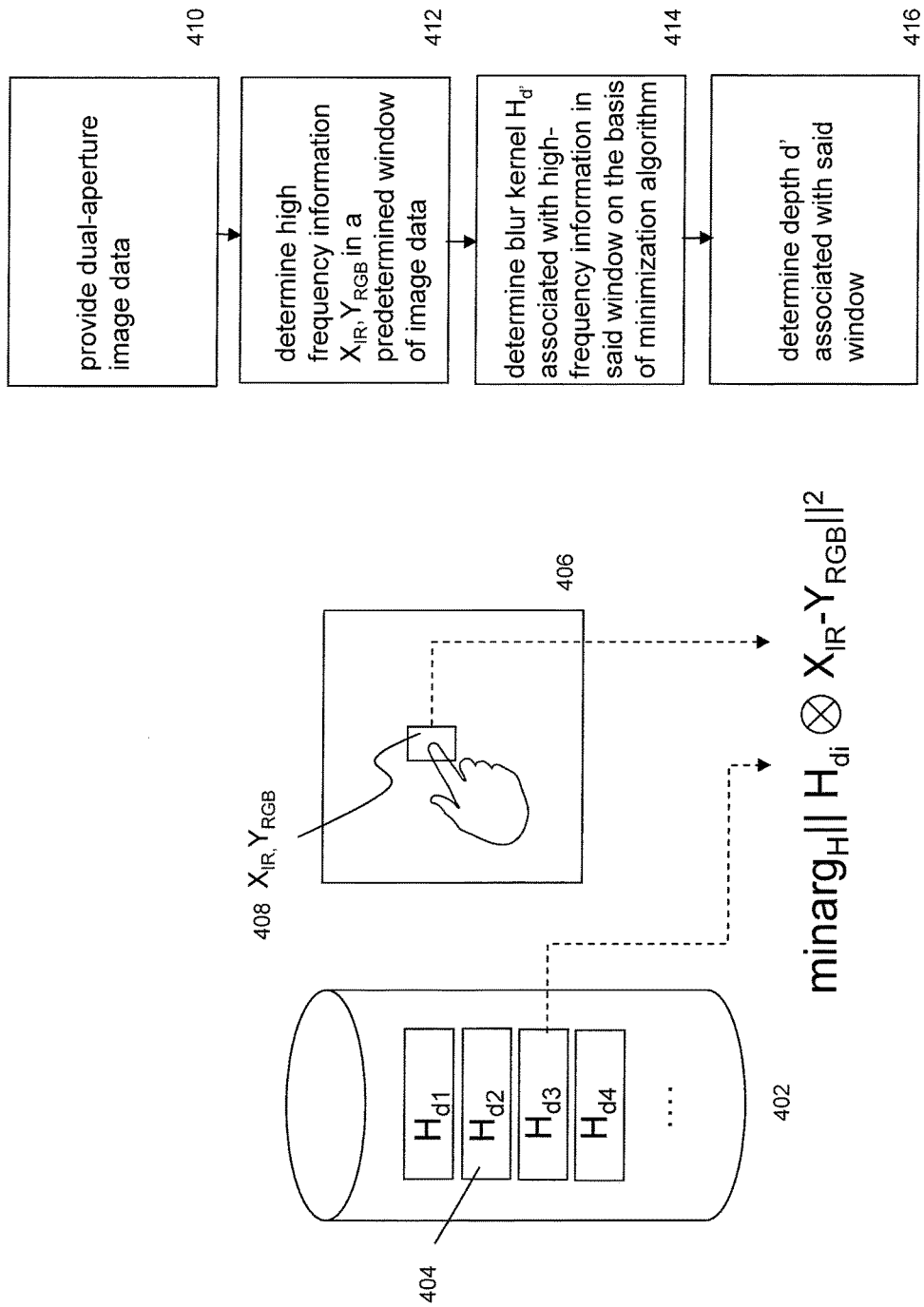
FIGS. 4A and 4B depicts a system and a method for generating a depth map for use in a gesture based user interface according to an embodiment of the invention.

FIGS. 4A and 4B depicts a system and a method for generating a depth map for use in a gesture-based UI system. In particular, FIG. 4A depicts part of a depth map generator for generating a depth map on the basis of image data generated by a multi-aperture image sensor. The gesture-based UI system may comprise a memory comprising a filter bank 402 comprising a set of N blur kernels $H_{di}$ (i=1, . . . , N) 404, each being associated with particular object distance (depth) $d_i$. The filter bank 402 may be determined and pre-configured in a memory of the gesture-based UI system using a process as described with reference to FIGS. 3A and 3B.

The multi-aperture image sensor may produce image data, e.g. an image frame 406 (step 410), which is subsequently processed by the data-processing module. In particular, in one embodiment, the color and infrared image data associated with a predetermined window 408 are high frequency filtered in order to obtain sharpness information for the color channels $Y'_{RGB}$ and the infrared channel $X'_{IR}$ (step 412).

$Y'_{RGB}$ and $X'_{IR}$ relate to a unknown object distance d', which may be determined by associating the high-frequency image data (i.e. sharpness information of the different color and infrared channels) to a suitable blur kernel $H_{d'}$ in the filter bank on the basis of a non-blind deconvolution scheme. This deconvolution operation may be determined on basis of a minimization function (step 414).

In one embodiment, the blur kernel associated with the predetermined window may be determined on the basis of a minimization algorithm wherein $\text{minarg} \|H_{di} \otimes X_{IR} - Y_{RGB}\|^2$ is determined iteratively for each or at least a part of the blur kernels in the filter bank. The algorithm may use various known methods such as natural images prior, Gaussian prior or sparse prior in order to help determination of the most suitable blur kernel.

The distance (depth) d' associated with the predetermined window is determined on the basis of the blur kernel $H_{d'}$ producing the lowest output level (step 416). If all output levels are above a predetermined value, no distance can be associated to pixels in that particular window. This process may be repeated for each pixel or groups of pixels of an image frame or part of an image frame rendered by the multi-aperture sensor image, thus forming a depth map wherein a depth value is assigned to a substantial part of the pixels in the image frame 406 (or part 408 of the image frame 406).

Hence, from the above it follows that the depth map may be determined by associating blur filters in the filter bank 402 with the sharpness information of the infrared and color channels in a particular window 410 of an image frame 406. A deconvolution algorithm may be used to determine the blur filter. Known fast deconvolution algorithms may be selected in order to allow real-time, dynamic generation of depth maps associated with a sequence of image frames generated by the multi-aperture imaging system.

Figure 5:
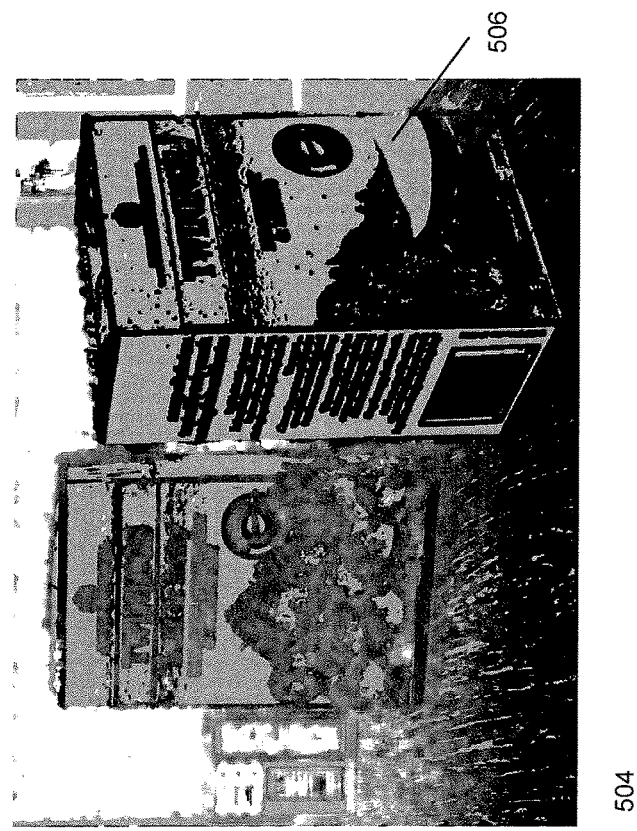
FIG. 5 depicts an image and an associated depth map generated by a multi-aperture imaging system.
Figure 5:

FIG. 5 depicts an image 502 and an associated depth map 504 generated by a multi-aperture imaging system. In the depth map, depth information is illustrated using gray-scales: the darker the gray-scale, the closer the object is located to the image sensor. Certain areas in the image frame with no or only a small amount of sharpness information, i.e. smooth areas without any edges, are less suitable for determining the distance. These areas (denoted in a predetermined grey color 506) are disregarded by the depth map generating function. Alternatively, depth values associated with these areas may be estimated by the surrounding calculated depth values (not shown).

Figure 6:
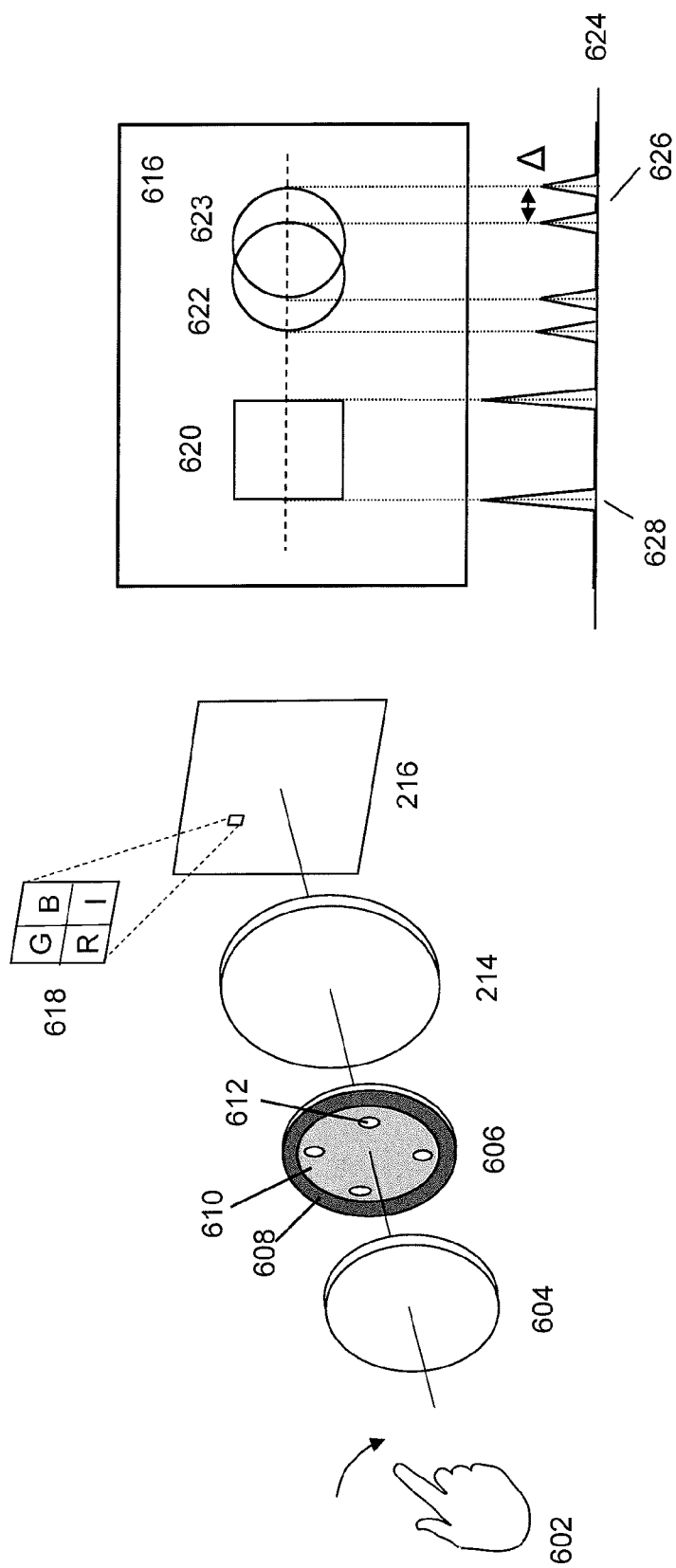
FIG. 6 depicts a schematic of a multi-aperture imaging system for generating depth information according to further embodiment.

FIG. 6 depicts a schematic of a multi-aperture imaging system 600 for generating depth information. In this embodiment, the depth information is obtained using an alternative multi-aperture configuration. Instead of one infrared aperture in the center as e.g. depicted in FIG. 2, the multi-aperture 606 in FIG. 6 comprises multiple, small infrared apertures 612 at the edge (or along the periphery) of the stop 608, which forms the outer periphery of the larger color aperture 610. These multiple small apertures 612 are substantially smaller than the single infrared aperture as depicted in FIG. 2, thereby providing the effect that an object that is in focus, is imaged by these small apertures onto the imaging plane 616 of an RGBI image sensor as a sharp single infrared image 620.

In contrast, an object that is out-of-focus is imaged onto the imaging plane as two laterally displaced infrared images 622,623. Here, the first infrared image 622 associated with at least a first infrared aperture is displaced over a particular distance Δ with respect to a second infrared image 623 associated with at least a second infrared aperture. Instead of a continuously blurred image normally associated with an out-of-focus lens, the multi-aperture 606 comprising multiple small infrared apertures 612 allows the formation of discrete, sharp images. When compared with a single infrared aperture, the use of multiple infrared apertures 612 allows the use of smaller apertures thereby achieving further enhancement of the depth of field. The further the object is out of focus, the larger the distance Δ over which the images as displaced. Hence, the distance Δ between two laterally displaced infrared images 622, 623 is a function of the distance (depth) between the object and the camera lens 604 and may be used for determining a depth function R(s). Hence, in this case the depth function R(s) may be determined by imaging a test object at multiple distances from the camera lens 604 and measuring Δ at those different distances. R(s) may be stored in the memory of the camera, where it may be used by the DSP in order to generate a depth map.

After simultaneously capturing both visible and infrared image signals in one image frame, the DSP may separate the color and infrared pixel signals in the captured raw mosaic image using e.g. a known demosaicking algorithm. The DSP may subsequently use a high pass filter on the infrared image data in order to obtain the high frequency components of infrared image data, which may comprise areas where objects are in focus and areas where objects are out-of-focus.

Further, the DSP may derive depth information on the basis the high-frequency infrared image data using an auto-correlation function. This process is schematically depicted in FIG. 6. When taking the autocorrelation function 624 of (part of) the high-frequency infrared image 616, a single spike 628 will appear at the high-frequency edges of an imaged object 620 that is in focus. In contrast, the autocorrelation function will generate a double spike 626 at the high frequency edges of an imaged object that is out-of-focus. Here the shift between the spikes represents the lateral displacement Δ between the two high-frequency infrared images 622, 623, which is dependent on the distance s between the imaged object and the camera lens 604.

Hence, when taken the auto-correlation function of (part of) the high-frequency infrared image, double spikes 626 (or peaks) will appear at locations in the high-frequency infrared image where objects are out-of-focus. The distance between the two peaks 626 provides a distance measure (i.e. a distance away from the focal distance). Further, a single spike 628 will appear at locations in the image where objects are in focus. The DSP may process the autocorrelation function by associating the distance between the double spikes 626 to a distance using the predetermined depth function R(s) and transform the information therein into a depth map. Hence, in this embodiment, the depth map can be generated on the basis of the infrared image data only by simply transforming the lateral displacement between infrared images (or the high-frequency image data thereof) into a distance between the camera and an object.

Figure 7:
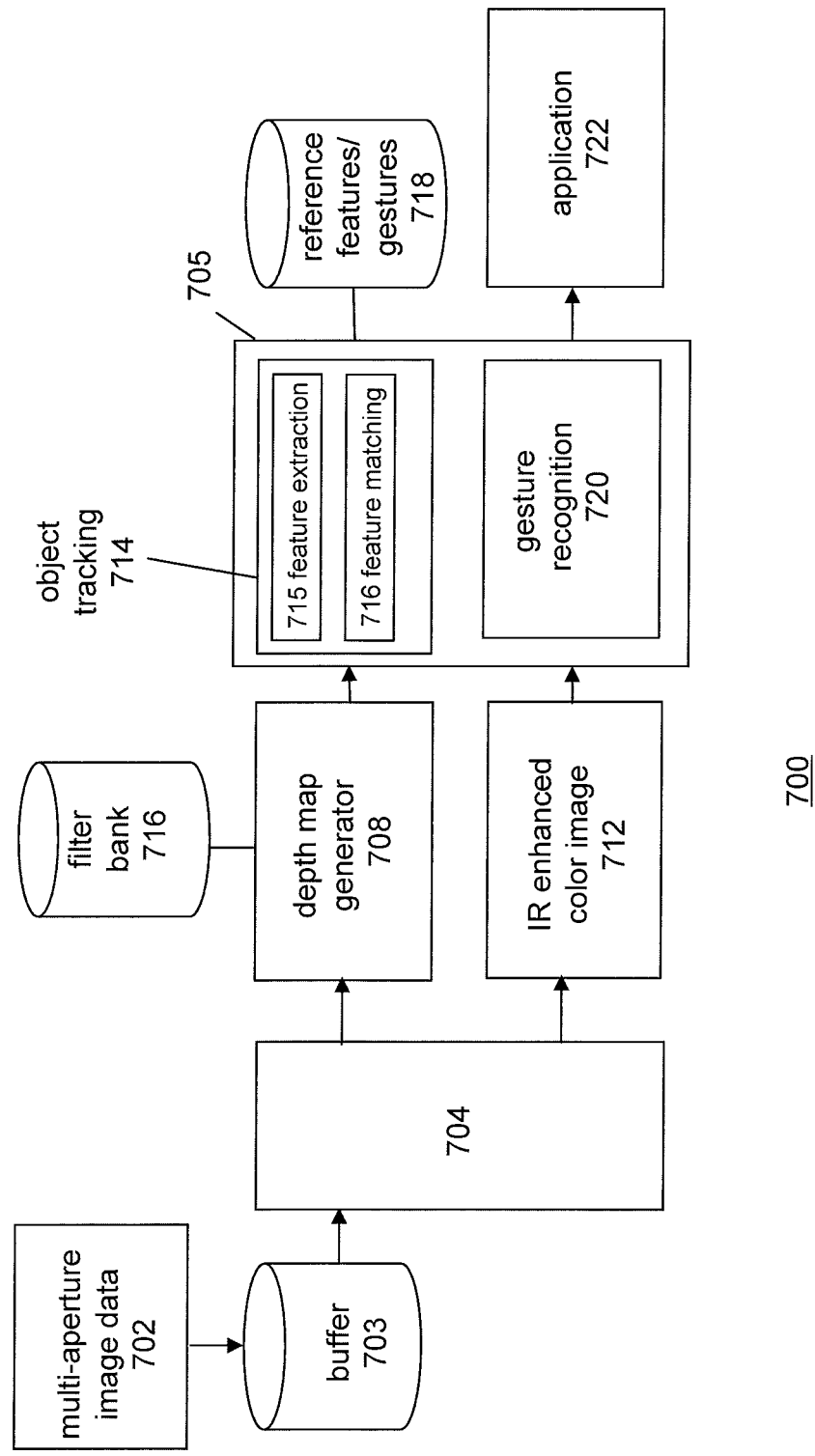
FIG. 7 depicts a system for enabling a gesture based user interface according to an embodiment of the invention.

FIG. 7 depicts at least part of a gesture-based UI system. In particular, FIG. 7 schematically depicts (part of) a gesture-based UI system 700 comprising a multi-aperture image sensor 702 for generating multi-aperture image data, which are temporarily stored as a sequence of image frames (stream) in a buffer 703 and used by a depth-map generator 708 for continuously generating a depth map on the basis of filters in a filter bank 716. The system 700 further comprises a gesture recognition module 705 for recognizing gestures in a sequence of image frames. In some embodiments, the image data may be pre-processed by a digital signal processor 704 (as described with reference to FIG. 1). In particular, image data may be pre-processed by running image data associated with an infrared channel and/or one or more color channels through a high frequency filter in order to obtain the sharpness information $Y_{RGB}, X_{IR}$ associated with that channel. In another embodiment, the color and infrared image data may be processed in order to generate an enhanced color image, i.e. a color image which is enhanced with sharpness information from an infrared channel as described above with reference to FIG. 1.

The depth map generator 708 may determine a depth map on the basis the infrared and one or more color channels in an image frame and the filter bank 716 as described in detail with reference to FIGS. 4A and 4B.

The gesture recognition module 705 may be configured to detecting a particular object in a sequence of image frames and to relate that object to a gesture, e.g. hand or finger gesture. The gesture recognition module 705 generally comprises an object tracking function 714 for detecting an object, e.g. a hand (or a part thereof) in the image data and tracking a detected object in a sequence of image frames. The gesture recognition module 705 may further comprise a gesture recognition function 720 for recognizing a gesture, e.g. a hand or finger gesture. The function 720 analyzes the trajectory of a detected object in order to determine whether it can be classified as (or matched with) a trajectory of a predetermined gesture.

In one embodiment, it is assumed that a hand gesture is associated with image data, which are relatively close to the camera, e.g. within a range of 1 to 100 cm. Hence, on the basis of the depth information of nearby objects, e.g. a hand or part(s) thereof or a pointing device, and the background may be distinguished. This way one or more regions of interests (ROIs) in an image frame may be determined on the basis so-called foreground depth values. Pixels associated with foreground depth values, i.e. depth values closest or at least within a predetermined (close) distance range with respect to the camera, can be distinguished from the background.

In a further embodiment, the hand detection process may be further improved using an enhanced color image produced by blending a high frequency filtered infrared image frame with a low frequency filtered color image frame as described above with reference to FIG. 1. This infrared enhanced color image may be analyzed by a hand recognition function 712 for analyzing the image in terms of color (i.e. skin color) and shapes in order to find one or more regions of interests (ROIs) associated with a hand or parts thereof. This information may be combined with the information on the ROIs as determined on the basis of the depth information in the depth map. This way it is possible to accurately recognize one or more ROIs comprising pixels which can be associated with a hand or a part thereof 710.

The depth map or a sequence of depth maps of the hand (or a part thereof) is then used by the gesture recognition module 720. Here, features may be extracted using a known feature extraction methods and compared with reference (model) features stored in a memory 718.

The object tracking function 714 may comprise a feature extraction function 715 and a feature matching function 716. The feature extraction function may receive one or more image frames, e.g. infrared enhanced color frames, or depth maps. The function 714 may then extract suitable features (i.e. specific structures in an image or a depth map such as edges or corners) in a predetermined ROI and temporarily store these extracted features in a memory.

In one embodiment, a region of interest (ROI) comprising an object of interest, typically a body part, may be determined on the basis of the depth map. For example, when dealing with hand and/or finger features, the ROI may be determined on the basis of foreground depth values, i.e. small depth values, representing objects relatively close to the image sensor (which is usually the case with hand and finger gestures). This way one or more ROIs associated with one or more object close to the image sensor may be efficiently distinguished from objects, which are located in the background further away from the camera. In one embodiment, the location of the thus determined ROIs may then be used to analyze pixels (e.g. extract features) in the same ROIs of the associated infrared enhanced color image.

Features may be stored in the form of a specific data structure usually referred to as a feature descriptor. Various known feature descriptor formats, including SIFT (Scale-invariant feature transform), SURF (Speeded Up Robust Features), HIP (Histogram Intensity Patches), BRIEF (Binary Robust Independent Elementary Features), ORB (Oriented-BRIEF), Shape Context, etc., may be used.

After extracting features in the ROI, a feature matching function 716 may be executed. The feature matching function 716 may receive reference features stored in a database 718 associated with an object to be recognized, e.g. hand and/or finger parts or a finger print. The reference features 718 may be pre-provisioned in a memory of the electronic device or retrieved from a server in the network. Thereafter, the extracted features may be matched with the reference features of an object to be recognized wherein the matching may e.g. be computed on the basis of the Euclidean distance between two vectors, the Hamming distance between two bitmasks, etc. This way, pairs of matched extracted/reference features may be generated wherein an error value may be assigned to each pair. A threshold parameter associated with the error value may be used in order to determine which matched pairs are considered to be successfully matched feature pairs. If a sufficiently large number of successfully matched pairs are generated, it may be determined that these features define such object.

Then the trajectory of a detected object may be tracked by repeating the feature extraction and matching processes for successive image frames. The tracking may be based on a scheme as described e.g. in the article by Al-Hamadi et al. with title "Hand Gesture Recognition Based on Combined Feature Extraction", International Journal of Information and Mathematical Sciences 6:1 2010. For successive image frames, the feature extraction 714 and matching 716 functions may determine location, orientation and velocity features of one or more predetermined object points (e.g. a centroid coordinate of a hand or one or more fingertip coordinates).

When the location of such points is determined in a suitable coordinate system (e.g. Cartesian coordinate system), the orientation and velocity may be derived on the basis of the coordinates of those points in successive frames generated in accordance with a certain frame rate. This way, for each image frame an associated vector comprising location, orientation and a velocity feature may be determined. An ordered set of vectors may define a spatio-temporal trajectory of the tracked object and may be input to an Hidden Markov Model in order to determine whether the trajectory corresponds to specific reference gesture stored in a database 718.

In another embodiment, instead of using the time evolution of features derived from 2D images such as an infrared enhanced color image, 3D features may be derived on the basis of the depth map. In one embodiment, for example, 3D volumetric shape descriptors as described in the article by Suryanarayan et al. with title "Dynamic Hand Pose Recognition using Depth Data", Pattern Recognition (ICPR), 2010 20th International Conference Istanbul 23-26 Aug. 2010, may be used to determine process depth map features. 3D volumetric shape descriptors use a cylindrical coordinate system for describing the 3D pose of a hand in a scale invariant way.

In further embodiments, gesture recognition module 705 may use both (part of) an infrared enhance image frame and an associated depth map in order to track an object (e.g. a hand and/or one or more finger(tips), and identify a trajectory of such object as a gesture for controlling a software application. It is further submitted, that the invention is not limited to the above-mentioned feature extraction and gesture recognition methods and that other known techniques may also be used in order to achieve the desired effects.

Once the gesture recognition module 705 has identified a tracked object as a predetermined gesture, it may generate a predetermined control signal, which may be sent to a software application. On the basis of the control signal, the software application activates a certain function in accordance with the recognized gesture. Various ways of controlling electronic device or an application executed thereon are described hereunder in more detail with reference to FIG. 8-11.

Figure 8B:
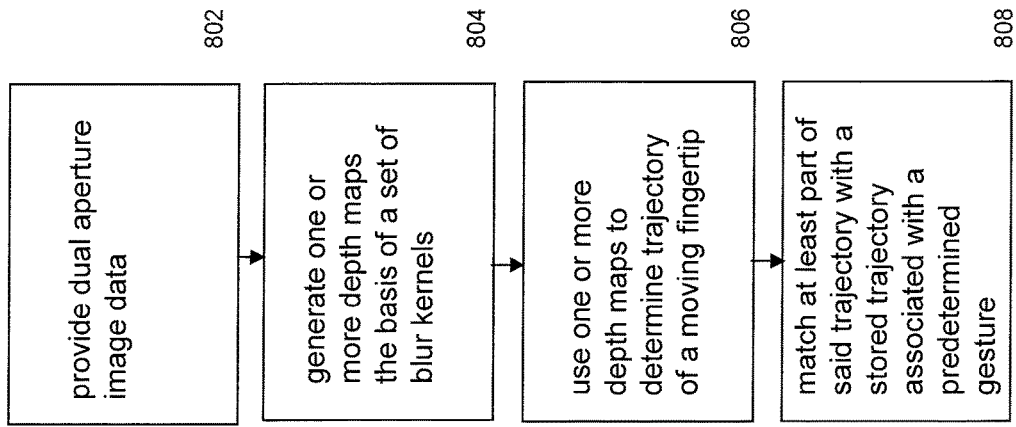
FIGS. 8A and 8B depict controlling an electronic device or an application running thereon on the basis of a gesture based user interface according to an embodiment of the invention.
Figure 8A:
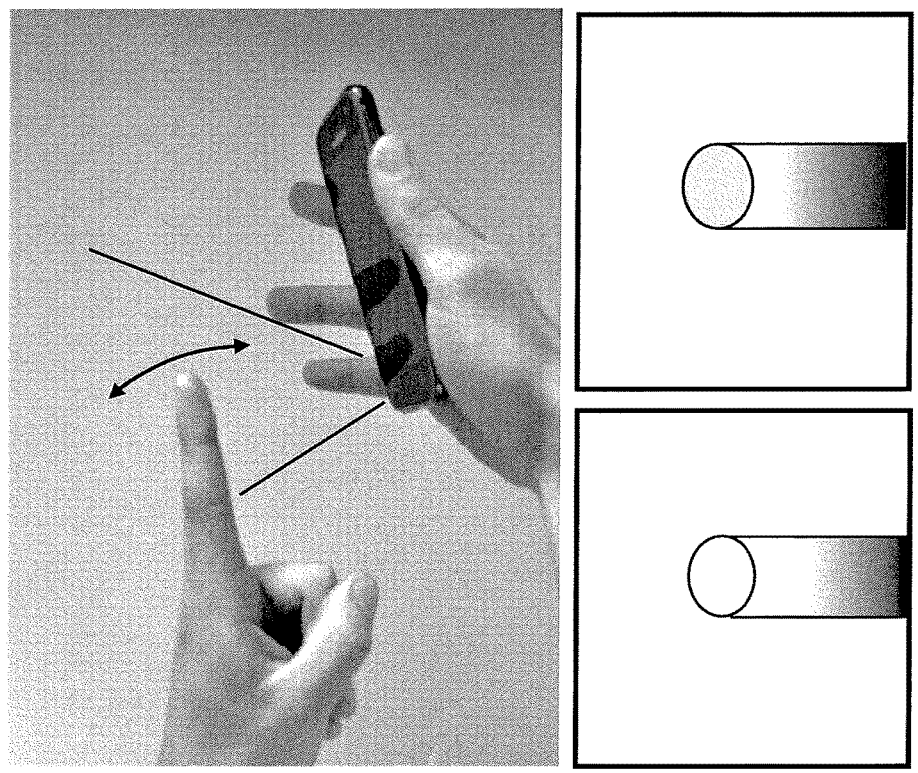

FIG. 8 depicts the principle of controlling an electronic device or an application running thereon on the basis of a gesture based user interface system. FIGS. 8A-8B depict the control of an electronic device or an application running thereon on the basis of a depth map of a simple single finger gesture or a gesture associated with pointing object. In this particular set-up, a user may position a finger in the field of view of the multi-aperture image sensor of the gesture-based user interface system (step 802). Then, on the basis of the image data generated by the multi-aperture image sensor, gray-scale depth maps of the finger may be generated (FIGS. 8A and 8B) on the basis of a predetermined depth function stored in the memory of the electronic device. In one embodiment, the depth function may comprise filter bank comprising a set of blur kernels (step 804) as discussed with reference to FIGS. 3 and 4. The depth map may be continuously updated by the gesture recognition module, which may further execute the object recognition and tracking function for recognizing a predetermined object in an image (in this particular example a part of a finger) in the depth map and determining the finger part closest to the electronic device, e.g. a fingertip. After having identified the finger part, the movements of the fingertip may be tracked in three dimensions (step 806) and determine whether the trajectory can be associated with a trajectory of a predetermined gesture stored in the database (step 806).

For example, a user may move its fingertip towards the electronic device from a first position to a second position (FIG. 8A) within a predetermined time. This movement may be detected as a relative movement of the fingertip in the z-axis direction (in this example a direction substantially perpendicular to the main plane of the electronic device). The gesture recognition module may determine the trajectory of the moving fingertip on the basis of a sequence of depth maps and compare this trajectory to predetermined trajectories stored in the memory. If the tracked trajectory of the fingertip substantially matches a stored trajectory, the gesture module may associate the matched trajectory with a control signal. For example, the simple trajectory of the finger tip in FIG. 8A may define an activation gesture for activating or selecting a certain item or menu on a display of the electronic device (similar to pressing a mouse button).

Hence, on the basis of (part of) a single finger gesture, the finger tip, i.e. the hand part closest to the multi-aperture image sensor, may be tracked on the basis of the depth map thereby allowing emulation of cursor control displayed using display of the electronic device. The location of the fingertip may be tracked on the basis of multiple subsequent depth maps, which are generated on the basis of a stream of image frames generated by the multi-aperture image sensor. Fast motion of the fingertip in the depth direction towards the image sensor may be recognized by the gesture recognition module as an activation gesture for triggering an activation function (similar to a click action of a mouse).

In one embodiment, the meaning of a gesture may depend earlier recognized gestures. For example, in one embodiment, after an activation gesture as described above, a subsequent fast finger motion in the direction of the image sensor may be recognized by the gesture recognition module as an de-activation gesture for triggering a de-activation function.

Various gestures may be defined on the basis of one or more trajectories of a finger tip. As described above, a rapid finger motion towards the image sensor may be recognized as an single click (de)activation.

In another embodiment, a distance-based "click-and-hold" gesture control may be defined by a predetermined sequence of gestures, including: a first trajectory relating to a fast finger movement towards the image sensor, wherein the finger is hold down at a predetermined distance from the image sensor (i.e. a downward click); wherein a second trajectory defines the movement of the finger in a plane at the predetermined distance (i.e. hold click down); and, wherein a third trajectory is defined by a finger moving (backwards) away from the image sensor (click release).

In yet another embodiment, an action-based "click-and-hold" gesture control may be defined by a predetermined sequence of gestures, including: a first trajectory relating to a fast finger movement towards the camera for moving the software program from a first (deactivated) state to a second (activated) state (i.e. a downward click); wherein a second trajectory defines the movement of the finger in a plane at the predetermined distance (i.e. hold click down); and, wherein a third trajectory is defined by second fast finger movement towards the camera for moving the software program back from a second (activated) state to a first (deactivated) state (click release).

Further, the gesture recognition module may determine the trajectories of multiple fingertips on the basis of a sequence of depth maps and compare this trajectories to predetermined trajectories stored in the memory. For example, as depicted in FIG. 9A, a user may positions at least two fingers in the field of view of the multi-aperture image sensor of the gesture-based user interface system. The user may move his or her fingers relative to each other while keeping the fingers in the field of view. For example, one particular gesture may relate to moving fingers relative to each other such that either a first or second fingertip will be closest to the electronic device. The gesture recognition module may detect the two finger tips, determine the trajectories of the two moving fingertips on the basis of a sequence of depth maps and compare this trajectories to predetermined trajectories stored in the memory. If the tracked trajectories of the fingertips substantially match stored trajectories, the gesture module may associate the matched trajectory with a control signal.

For example, the two-finger gesture depicted in FIG. 9A may be used to control a game, e.g. the movement of a simulated object such as a vehicle in a flight simulator or a racing game, wherein the relative position of the two fingertips determines the direction a software simulated vehicle is moving. If the first finger is closest to the electronic device, the gesture-based user interface may generated a control signal for a simulation software program to move a simulated object to a first direction (e.g. the left) and if the second finger is closest to the electronic device the object may move to a second direction (e.g. the right).

In one embodiment, a magnitude value may be associated to the difference in depth between the first and second finger. Such magnitude value may provide further gesture control of a software program. For example, the magnitude value may be used in the above-mentioned software program for controlling the movement of an object wherein an object can be controlled to make a sharp or a wide turn depending whether a large or small depth difference between the two finger tips exists.

Hence, from the above-described embodiments, it follows that the gesture-based user interface system, allows intuitive gesture-based control of a software program. The user interface allows accurate control of an electronic device or an application running thereon on the basis depth maps generated using image data of a multi-aperture image sensor part. The user interface system is suitable for use in mobile equipment allowing control of an application running thereon without requiring the user to be in physical contact with the electronic device.

An embodiment of the above-described gesture based control is schematically depicted in FIG. 9B, wherein on the basis of the captured multi-aperture image data (step 902) and a filter bank comprising blur kernels a depth map is generated (step 904). The depth map may be input to the object tracking function and the gesture recognition function of the graphical user interface system in order to recognize and track two or more fingertips of a user. The trajectories of the fingertips may be identified (step 906) as a two or multi-finger gesture for controlling a software application wherein the relative depth difference between at least two fingertips may determine a magnitude value, which is used by the software application as an input.

Figure 10B:
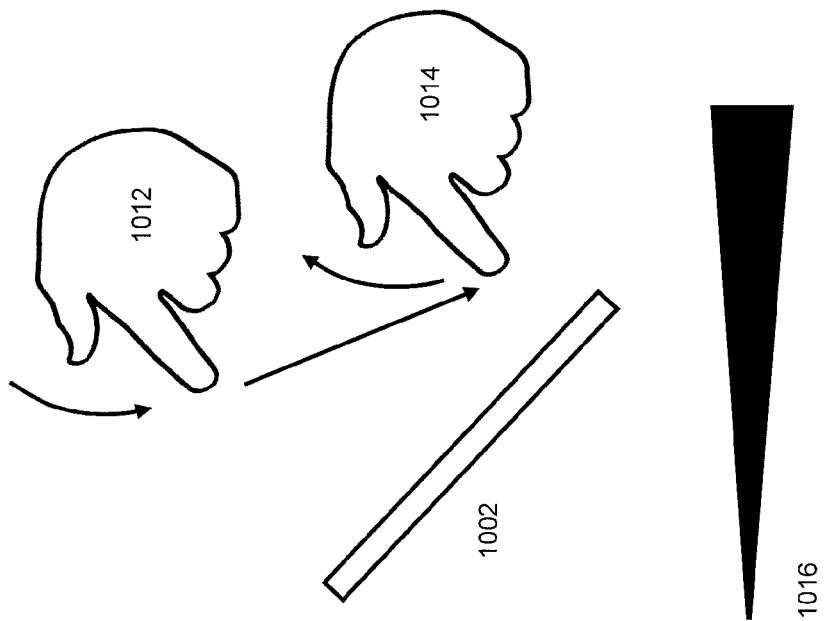
FIGS. 10A and 10B depict controlling an electronic device or an application running thereon on the basis of a gesture based user interface according to another embodiment of the invention.
Figure 10A:
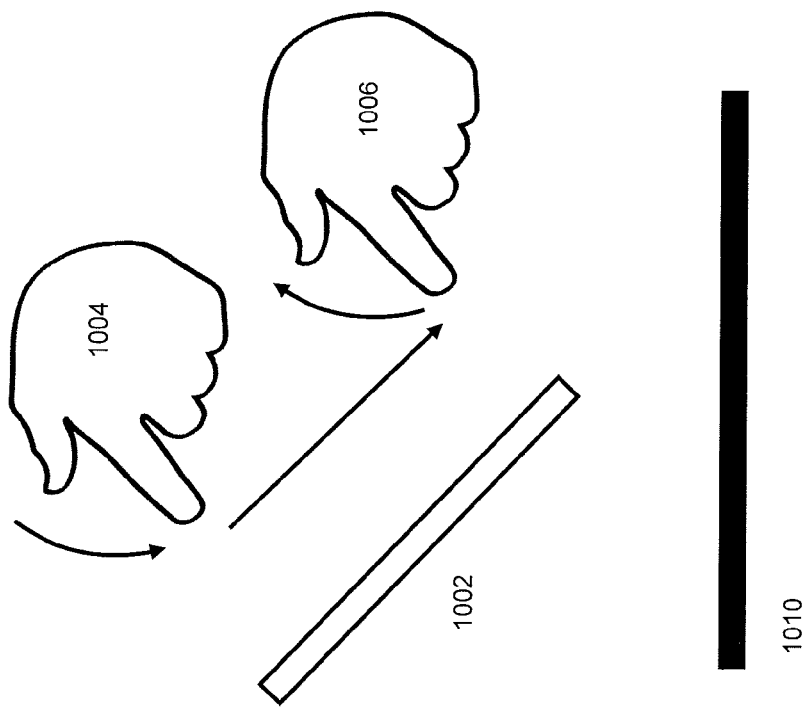

FIGS. 10A and 10B depict controlling an electronic device or an application running thereon on the basis of a gesture based user interface. FIGS. 10A and 10B depict the control of a software application on the basis of a depth map wherein the three dimensional movement of a finger is used to control writing and/or drawing on a screen. For example, in FIG. 10A a graphics software program may be triggered by a first gesture associated with a rapid motion of a fingertip towards 1012 the image sensor and the display 1002. This gesture may be recognized by the gesture based user interface and activate a graphics function, e.g. a line drawing function. Thereafter, a user may move its fingertip in a plane parallel to the display wherein the 2D movement of the fingertip allows the drawing of a line 1010 on the display. When the user rapidly moves the fingertip away 1014 from the screen, the gesture based user interface may trigger deactivation of the graphics function.

FIG. 10B depicts a further variant of the graphics software program depicted in FIG. 10A. In this particular embodiment, when drawing a line by moving the fingertip in a 2D plane, pressure may be emulated gently moving the fingertip closer to the electronic device. Hence, in that case, the distance of the fingertip from the electronic device is indicative of the pen pressure resulting in a line 1016 that gets broader. Hence in contrast to touch-sensitive displays wherein the finger does not provide adequate and accurate control, the embodiments in FIGS. 10A and 10B illustrate that the gesture-based user interface system may use depth information for accurately controlling a software application without the need to be in physical contract with the user interface (such as a touch screen).

Figure 11B:
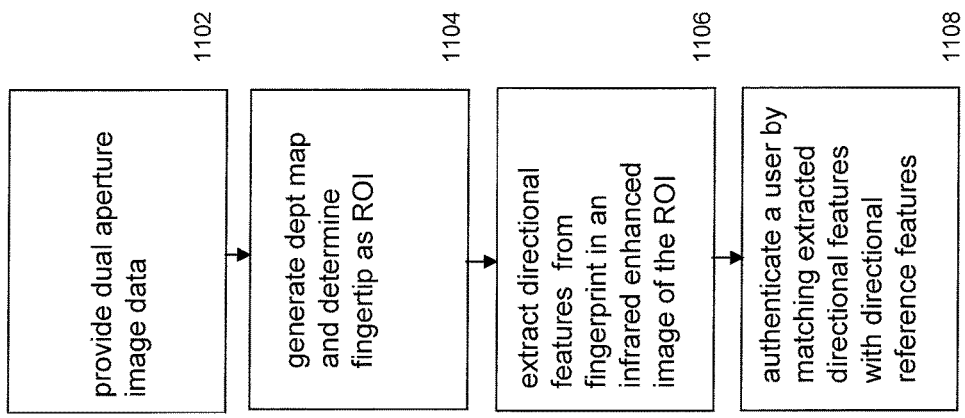
FIGS. 11A and 11B depict a gesture based user interface for use in a biometrical authentication process according to an embodiment of the invention.
Figure 11A:
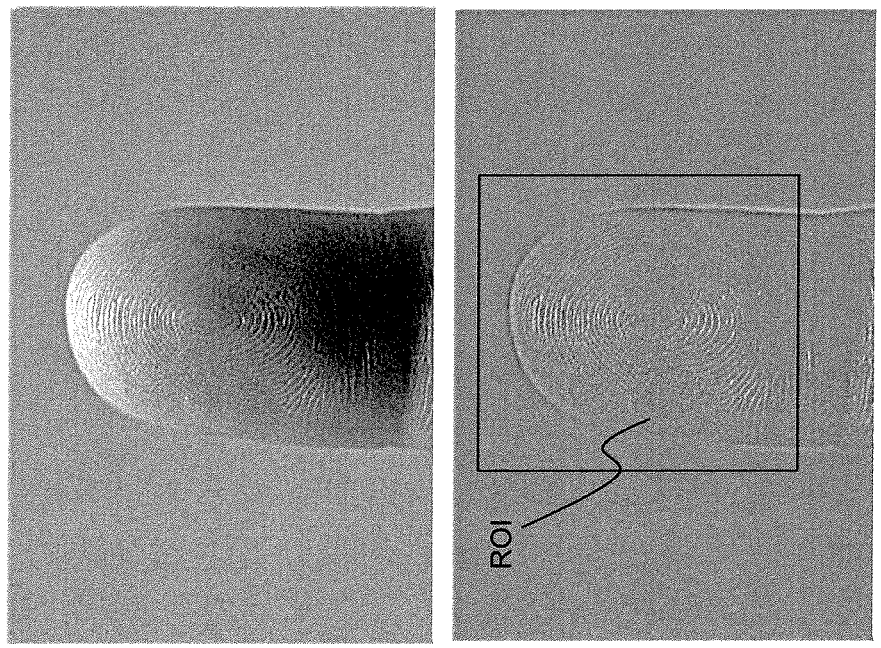

FIGS. 11A and 11B illustrate the use of a gesture-based user interface system in a biometrical authentication process. In this particular embodiment, the electronic device may comprise a software program for authenticating or identifying a user using biometrical data rendered by the gesture-based user interface system of the present invention. In one embodiment, the program may request a user to put a finger into the field of view of the multi-aperture image sensor in order to generate image data (step 1102). The gesture recognition module may subsequently generate a depth map of the imaged finger using the multi-aperture image data and a set of blur kernels in a pre-configured filter bank in order to determine the fingertip (closest to the image sensor) as a ROI (step 1104).

An infrared enhanced image associated with the depth map may be used to extract fingerprint features from the ROI. In one embodiment, features may be extracted on the basis of so-called minutia points (i.e. ridge endings and/or bifurcations) in a fingerprint. These extracted minutia point features are then matched with stored reference features associated with minutia points of a fingerprint of a user to be authenticated.

In one embodiment, features may be extracted from the ROI in an infrared enhanced color image using a directional filter algorithm (step 1106), preferably a directional Gabor filter algorithm or a derivative thereof. In that case, the ROI of a fingerprint is filtered in a predetermined number of directions using a Gabor-type filter bank comprising a set of directional filters. Thereafter, directional features are determined on the basis of the directional filters and matched with a stored set of directional reference features so that a user may be authenticated is a match is found (step 1108). A match may be determined if the difference between the features associated with the ROI and the reference features is below a certain threshold value.

Embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

It is to be understood that any feature described in relation to any one embodiment may be used alone, or in combination with other features described, and may also be used in combination with one or more features of any other of the embodiments, or any combination of any other of the embodiments. Moreover, the invention is not limited to the embodiments described above, which may be varied within the scope of the accompanying claims.

The invention claimed is:

1. A computer-implemented method for a gesture-based user interface for controlling a software program on an electronic device, said method comprising:
   receiving image data from a multi-aperture image sensor in said electronic device, said image sensor being configured to simultaneously expose an image sensor to at least a first part of the electromagnetic (EM) spectrum using a first aperture and at least a second part of the EM spectrum using one or more second apertures;
   determining sharpness information in at least one area of said image data associated with at least part of an object imaged by said first aperture and said one or more second apertures onto the image plane of said image sensor;
   generating depth information on the basis of at least part of said sharpness information; and,
   recognizing on the basis of said depth information, at least part of a gesture associated with a movement of said object.

2. The method according to claim 1, further comprising:
   determining first image data associated with said first part of the electromagnetic spectrum;
   determining second image data associated with said second part of the electromagnetic spectrum;
   generating depth information by relating first sharpness information associated with at least part of an image of said object in said first image data and second sharpness information associated with at least part of said image of said object in said second image data to a distance between said image sensor and said object.

3. The method according to claim 1, wherein generating depth information comprises generating said depth information on the basis a predetermined depth function stored in a memory of said electronic device, said depth function being configured for associating sharpness information in said image data to a distance between the image sensor and the object.

4. The method according to any of claim 1 wherein generating said depth information comprises:
   selecting a window in said image data;
   associating sharpness information in said window to a blur kernel in a set of blur kernels on the basis of a minimization algorithm;
   assigning a depth value associated with said blur kernel to one or more pixels in said window.

5. The method according to claim 4 wherein said minimization algorithm comprises:
   convoluting at least one of said blur kernels with said sharpness information in said window.

6. The method according to claim 1, further comprising:
   determining second image data associated with said second part of the electromagnetic spectrum;
   determining in said second image data at least two laterally displaced images, wherein each of said images is associated with a second aperture and wherein said images are associated with an object positioned at a distance before the image sensor;
   and wherein generating depth information comprises generating depth information on the basis of a predetermined depth function stored in a memory of said electronic device, said depth function being configured for associating the distance between said laterally displaced images to a distance between said image sensor and said object.

7. The method according to claim 6, wherein said multi-aperture image sensor comprises two or more second apertures configured with respect to each other such that each of said second apertures images an object onto the image plane of said image sensor, wherein the distance between said laterally displaced images is a function of the distance between said object and said image sensor.

8. The method according to claim 6, further comprising:
determining second high-frequency image data;
determining said distance by running said second high-frequency image data through an auto-correlation function.

9. The method according to claim 1 wherein generating depth information further comprises:
forming one or more depth maps by assigning depth values to at least part of said image data generated by said multi-aperture image sensor.

10. The method according to claim 1 wherein said first part of the EM spectrum is associated with at least part of the visible part of the EM spectrum; and/or, wherein said second part of the EM spectrum is associated with at least part of the invisible part of the EM spectrum.

11. The method according to claim 1 comprising:
determining at least part of a region of interest (ROI) in at least part of an image frame associated with said image data on the basis of said depth information.

12. The method according to claim 1 comprising:
determining at least part of a region of interest in at least part of an image frame associated with said image data on the basis of color information.

13. The method according to claim 1 wherein recognizing said gesture comprises:
extracting one or more depth features from said depth information.

14. The method according to claim 1 wherein recognizing said gesture comprises:
determining one or more trajectories;
correlating said determined trajectory with a reference trajectory associated with a predetermined gesture;
establishing the detection of a predetermined gesture if said determined one or more trajectories correlate with a one or more reference trajectories;
controlling said software program on the basis of said predetermined gesture.

15. The method according to claim 14 wherein said one or more trajectories are of one or more fingertips, said method further comprising at least one of the following:
controlling said software program on the basis of moving one or more finger tips over one or more predetermined trajectories in the field of view of said multi-aperture imaging system;
controlling said software program by moving a fingertip in a plane at a predetermined distance from said electronic device;
controlling an activation or a deactivation function in said software program on the basis of moving a fingertip from a first distance to a second distance in the field of view of said image sensor;
controlling said software program by moving said first detected finger tip relative to said second detected fingertip.

16. The method according to claim 1 said method further comprising:
on the basis of said depth map determining in said image data a region of interest associated with a fingertip;
extracting one or more directional features from an enhanced image formed by blending first low-frequency image data associated with said first part of the EM spectrum with said second high-frequency image data;
authenticating a user by matching said extracted directional features with directional reference features associated with a fingerprint of said user.

17. A gesture-based user interface system for use in an electronic device, said user interface system being configured to control a software program on said electronic device, said system comprising:
a multi-aperture image sensor configured to generate image data, said multi-aperture image sensor being configured to simultaneously expose an image sensor to at least a first part of the electromagnetic (EM) spectrum using a first aperture and at least a second part of the EM spectrum using one or more second apertures;
one or more filters configured to generate sharpness information in at least one area of said image data associated with at least part of an object, preferably at least part a human body part, imaged by said first aperture and said one or more second apertures onto the image plane of said image sensor;
a generator configured to generate depth information, on the basis of at least part of said sharpness information; and,
a gesture recognition module configured to recognize on the basis of said depth information a gesture associated with a movement of said object.

18. The user interface system according to claim 17, wherein said depth function is configured to associate first sharpness information associated with said first aperture and second sharpness information associated with said one or more second apertures to a distance between the image sensor and the object; or, wherein said depth function is configured to associate a distance between at least two laterally displaced images associated with at least two of said second apertures to a distance between said object and said image sensor.

19. The gesture-based user interface system according to claim 17, wherein said depth function is configured to associate first sharpness information associated with said first aperture and second sharpness information associated with said one or more second apertures to at least one blur kernel from a set of blur kernels stored in a memory of said electronic device, wherein each of said blur kernels is associated with a predetermined distance a distance between the image sensor and an object.

20. The user interface system according to claim 17 wherein said gesture recognition module is configured to:
determine one or more trajectories, preferably one or more spatial trajectories, of at least part of said body part on the basis said depth maps;
correlate said determined trajectory with a reference trajectory associated with a predetermined gesture;
establish the detection of a predetermined gesture if said determined one or more trajectories correlate with a one or more reference trajectories;
control said software program on the basis of said predetermined gesture.

21. The user interface system according to claim 17, wherein said gesture recognition module is configured to:
control said software program on the basis of moving one or more finger tips over one or more predetermined trajectories in the field of view of said multi-aperture imaging system; control said software program by moving a fingertip in a plane at a predetermined distance from said electronic device; control an activation or a deactivation function in said software program one the basis of moving a fingertip from a first distance to a second distance in the field of view of said image sensor; and/or, control said software program by moving said first detected finger tip relative to said second detected fingertip.

* * * * *